(12) United States Patent
Kandpal et al.

(10) Patent No.: US 6,714,739 B1
(45) Date of Patent: Mar. 30, 2004

(54) OPTICAL TRANSMISSION SYSTEMS AND OPTICAL RECEIVERS AND RECEIVING METHODS FOR USE THEREIN

(75) Inventors: Pramode Kandpal, Columbia, MD (US); Alistair J. Price, Columbia, MD (US); David F. Smith, Ellicott City, MD (US)

(73) Assignee: Corvis Corporation, Columbia, MD (US)

( * ) Notice: Subject to any disclaimer, the term of this patent is extended or adjusted under 35 U.S.C. 154(b) by 675 days.

(21) Appl. No.: 09/588,527

(22) Filed: Jun. 6, 2000

Related U.S. Application Data

(60) Provisional application No. 60/137,833, filed on Jun. 7, 1999.

(51) Int. Cl.$^7$ .......................... H04B 10/08; H04B 10/06
(52) U.S. Cl. ........................................ 398/31; 398/213
(58) Field of Search .............................. 398/16, 32, 33, 398/149, 158, 162, 159, 202, 209, 208, 31, 213; 385/37; 359/578, 589

(56) References Cited

U.S. PATENT DOCUMENTS

| | | | |
|---|---|---|---|
| 5,467,212 A | | 11/1995 | Huber |
| 5,504,609 A | | 4/1996 | Alexander et al. |
| 5,572,351 A | * | 11/1996 | Hadjifotiou .................. 398/213 |
| 5,673,129 A | | 9/1997 | Mizrahi |
| 5,715,076 A | | 2/1998 | Alexander et al. |
| 5,726,784 A | | 3/1998 | Alexander et al. |
| 5,777,773 A | * | 7/1998 | Epworth et al. ............. 398/185 |
| 5,784,184 A | | 7/1998 | Alexander et al. |
| 5,923,453 A | * | 7/1999 | Yoneyama .................... 398/34 |
| 5,943,147 A | * | 8/1999 | Vanoli et al. ................. 398/27 |
| 6,441,933 B1 | * | 8/2002 | Jang ............................ 398/79 |

* cited by examiner

*Primary Examiner*—Leslie Pascal
*Assistant Examiner*—Dalzid Singh

(57) ABSTRACT

An optical transmission system including at least one optical transmitter configured to transmit at least one signal wavelength and a tuning wavelength, an optical receiver including an optical filter having a filter bandwidth including the at least one signal wavelength and a percentage of the tuning wavelength and an optical to electrical signal converter configured to receive the at least one signal wavelength from said filter, a first tuning optical to electrical converter configured to receive a first portion of the tuning wavelength stopped by said filter, a second tuning optical to electrical converter configured to receive a second portion of the tuning wavelength passed by said filter, and a filter controller configured to tune the filter bandwidth based on the relative proportion of first and second portions of the tuning wavelength provided to the first and second tuning optical to electrical converters.

29 Claims, 9 Drawing Sheets

OPTICAL TRANSMISSION SYSTEMS AND OPTICAL RECEIVERS AND RECEIVING METHODS FOR USE THEREIN

CROSS-REFERENCE TO RELATED APPLICATIONS

This application is a continuation in part of U.S. Provisional Patent Application No. 60/137,833, filed Jun. 7, 1999, which is incorporated herein by reference.

STATEMENT REGARDING FEDERALLY SPONSORED RESEARCH OR DEVELOPMENT

Not Applicable.

BACKGROUND OF THE INVENTION

The present invention is directed generally to optical transmission systems. More particularly, the invention relates to optical transmission systems including optical receivers and receiving methods for use therein.

Optical communication systems transport information by generating optical signals corresponding to the information and transmitting the optical signals through optical transmission media, typically optical fiber. Information in various formats, such as audio, video, data, or any other formats can be optical transported through many different networks, such as local and long distance telephone, cable television, LAN, WAN, and MAN systems, as well as other communication networks.

Optical systems can be operated over a broad range of frequencies/wavelengths, which are suitable for high speed data transmission and are generally unaffected by conditions external to the media, such as electrical interference. Also, information can be carried using multiple optical wavelengths that are combined using wavelength division multiplexing ("WDM") techniques into one optical signal and transmitted through the optical systems. As such, optical fiber transmission systems have the potential to provide significantly higher transmission capacity at a substantially lower cost than electrical transmission systems.

Optical WDM systems were not initially deployed, in part, because of the high cost of electrical signal regeneration/amplification equipment required to compensate for signal attenuation for each optical wavelength throughout the system. The development of the erbium doped fiber amplifier (EDFA) provided a cost effective means to optically regenerate attenuated optical signal wavelengths in the 1550 nm range. In addition, the 1550 nm signal wavelength range coincides with a low loss transmission window in silica based optical fibers, which allowed EDFAs to be spaced further apart than conventional electrical regenerators.

The use of EDFAs essentially eliminated the need for, and the associated costs of, electrical signal regeneration/amplification equipment to compensate for signal attenuation in many systems. The dramatic reduction in the number of electrical regenerators in the systems, made the installation of WDM systems in the remaining electrical regenerators a cost effective means to increase optical network capacity.

However, the number of wavelengths/channels used in a WDM system is limited to specific wavelength ranges in which the optical amplifiers can amplify optical signals. Therefore, the number of wavelengths/channels used in the WDM system is also limited by how closely the signal wavelength can be spaced within the wavelength range of the amplifier.

The channel spacing in optical systems is limited by a number of factors, one of which is the modulation technique used in the optical transmitter. For example, direct modulation of the laser is the most cost effective technique for imparting information onto a carrier wavelength, because it avoids the need and the expense of an external modulator for each wavelength in the system. However, at high bit transmission rates, direct modulation results in excessive linewidth broadening and wavelength instability which limits the wavelength spacing in WDM systems.

In WDM systems, the wavelength spacing also can be limited, in part, by the ability to effectively separate wavelengths from the WDM signal at the receiver. Most optical filters in early WDM systems employed a wide pass band filter, which effectively set the minimum spacing of the wavelengths in the WDM system. The development of effective optical filters, namely in-fiber Bragg gratings, has provided an inexpensive and reliable means to separate closely spaced wavelengths. The use of in-fiber Bragg grating has further improved the viability of WDM systems by enabling direct detection of the individually separated wavelengths. For example, see U.S. Pat. No. 5,077,816 issued to Glomb et al. The use of fiber Bragg gratings to separate individual signal channels from WDM systems and provide the individual signal channels to photodiode receivers remains standard practice in many direct detection systems.

As the signal channel spacing in WDM system continues to decrease, it has become necessary to write increasingly narrow bandwidth fiber Bragg gratings. While narrow fiber Bragg gratings can be effectively written with today's technology, the refractive index of the fiber Bragg gratings and its reflective bandwidth varies with temperature. Typically the reflective bandwidth will vary by approximately 10 pm/° C. In lightly populated optical systems, the fiber Bragg gratings can be made sufficiently wide to account for drift in the reflective bandwidth. In more densely packed systems, it is necessary to control the drift of the fiber Bragg grating to ensure that the correct signal channel is received.

Most optical systems employing stabilized fiber Bragg gratings use various temperature controlling methods to stabilize the reflective bandwidth of the fiber Bragg grating. While this method is generally acceptable, it does not account for operational variations that occur in the fiber Bragg grating reflectivity and the wavelength of the transmitter. The inability of temperature tuned methods to fully account for operational variations will become an increasing problem as the channel spacing in WDM systems continues to decrease. Accordingly, there is a need for improved optical systems including optical receivers that can be controlled to receive signal channels in dense wavelength division multiplex systems.

BRIEF SUMMARY OF THE INVENTION

The apparatuses and methods of the present invention address the above need for higher performance optical receivers and receiving methods for use in optical systems. Optical systems of the present invention generally include an optical receiver having an optical filter with a filter bandwidth including at least one signal wavelength and at least a portion of a tuning wavelength. The optical receiver includes an optical to electrical signal converter and at least one optical to electrical tuning converter. The tuning converter receives a portion of the tuning wavelength, which is used to tune the filter bandwidth of the optical filter to track the at least one signal wavelength.

In various embodiments, first and second optical to electrical tuning converters are provided to receive first and second portions of the tuning wavelength that are stopped and passed, respectively by the optical filter. The relative amount of power received in the first and second portions is used to tune the optical filter bandwidth.

The optical filter can be a fiber Bragg grating configured to reflect one or more signal wavelengths and a percentage of optical energy in the tuning wavelengths and transmit the remaining energy in the tuning wavelength. High ratio optical taps can be provided to remove first and second portions of the tuning wavelength from the reflected and transmitted percentages of the tuning wavelengths.

The relative amounts of the tuning wavelength that is reflected and transmitted is used to tune the reflective bandwidth of the fiber Bragg grating. For example, the fiber Bragg grating can be designed to reflect and transmit 50% of the energy in the tuning wavelength. The fiber Bragg grating can be then tuned to maintain the 50% reflection/transmission based on the relative power received by the first and second tuning converters.

In various embodiments, the same tuning wavelength can be used to tune two or more different fiber Bragg grating filters in separate receivers to allow direct detection of a corresponding number of signal channels. For example, two Bragg grating filters and photodiode receivers can be used to detect signal channels at shorter and longer wavelengths than the tuning wavelength. Also, the fiber Bragg gratings can be used to filter multiple signal wavelengths that can be coherently detected, thereby decreasing the overall number of signal converters required in the system.

The tuning wavelength can be transmitted using the same transmitter as one or more of the signal wavelengths or using a different transmitter. It will be appreciated that using the same transmitter to transmit the signal wavelengths and the tuning wavelengths allows the tuning wavelengths to inherently track variations in the signal channel wavelengths.

The tuning wavelength can be transmitted as a subcarrier, when the signal channel is transmitted on a carrier wavelength of an optical source in the transmitter. Conversely, the tuning wavelength can be transmitted on the carrier wavelength, when one or more signal channels are transmitted on subcarrier signal wavelengths.

The tuning wavelength will generally be a low frequency modulation signal applied to allow detection of the tuning wavelength using lower cost, low frequency photodiodes as the optical to electrical tuning converters. The use of a low frequency photodiodes to detect the tuning wavelength also eliminates the need to filter the signal wavelengths from the signal being provided to the first and second tuning converters.

The tuning wavelength can also be used to carry information, such as system information, communications traffic, etc., from the transmitter node to the receiver node. For example, a signal wavelength or channel identifier can be included in the information, which can be particularly useful for tracking purposes in embodiments employing tunable transmitters and/or receivers.

Accordingly, the present invention addresses the aforementioned needs and provides improved optical systems, optical receivers, and methods that provide increased control over the receiver to allow for effective filtering and reception of closely spaced signal wavelengths. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same, wherein.

DESCRIPTION OF THE INVENTION

Figure 1:
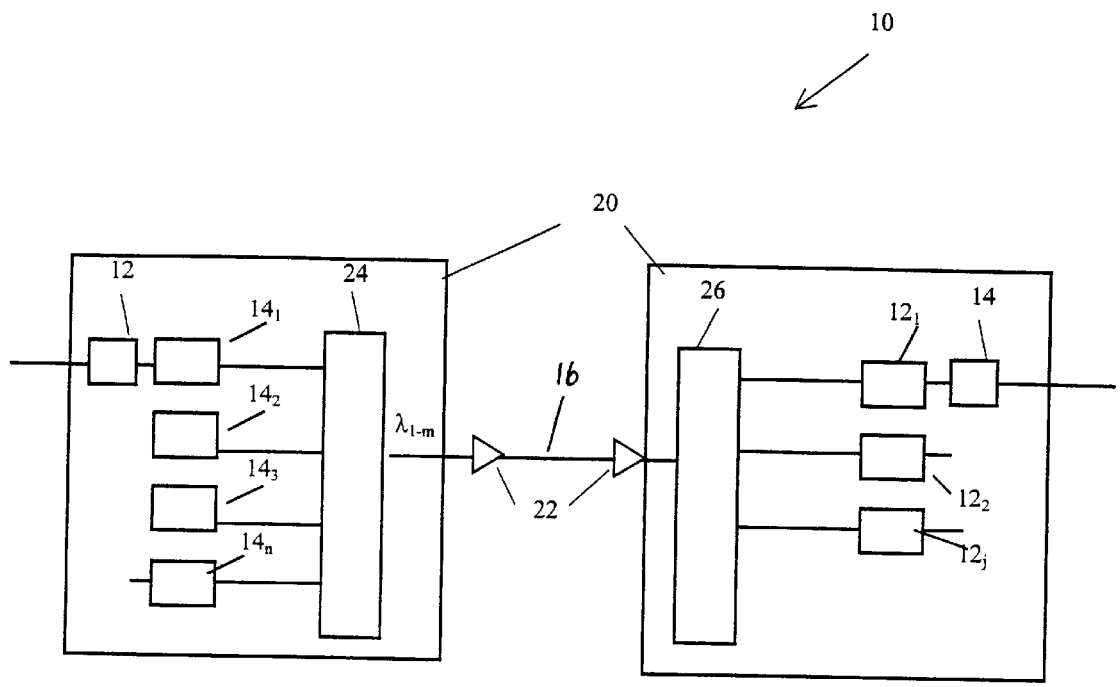
FIGS. 1–2 are schematic diagrams illustrating exemplary optical systems.
Figure 2:
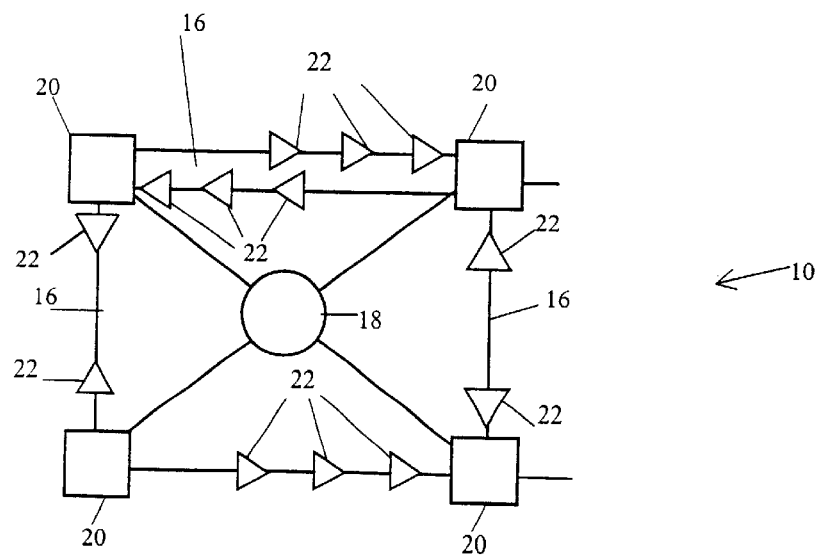

FIGS. 1 and 2 are schematic diagrams illustrating embodiments of an optical system 10 according to the present invention. The system 10 can be embodied as one or more serially connected point to point links, as illustrated in FIG. 1, or in a network, as illustrated in FIG. 2, which can be configured in various architectures and can be controlled by a network management system 18. The system 10 may include one or more receivers 12 and transmitters 14 disposed in optical processing nodes 20 and interconnected by one or more guided or unguided transmission media 16, such as optical fiber. It will be appreciated that the present invention can be deployed in either unidirectional or bi-directional systems with appropriate modification to combiners 24, distributors 26, amplifiers 22, and other components within the system 10.

The transmitters 14 are generally configured to transmit optical signals including one or more information carrying signal channels or wavelengths $\lambda_i$. As used herein, the term "information" should be broadly construed to include any type of audio or video signal, data, instructions, etc., that can be transmitted as optical signals. In the present invention, the transmitter 14 is configured to also transmit at least one tone or tuning signal at a tuning wavelength $\lambda_T$, in addition to the one or more information signals at wavelengths $\lambda_i$. The tuning wavelength $\lambda_T$ can be used by one or more receivers 12 to track one or more of the information signal wavelengths $\lambda_i$. Additional versatility in systems 10 can be provided by employing tunable transmitters 14, which allow the wavelengths being transmitted through the system 10 to be tailored to specific system configurations and network architecture.

The receivers 12 can be configured to receive at least one information carrying signal wavelength $\lambda_i$. For example, N transmitters 14 can be used to transmit M different information signal wavelengths $\lambda_i$ and L different tuning wavelengths $\lambda_T$ to J different receivers 12. One or more tuning wavelengths $\lambda_T$ can be used by one or more receivers 12 to track at least one of the information signal wavelengths $\lambda_i$ from the transmitters 14.

The optical processing nodes 20 may include optical components other than those illustrated in FIGS. 1 and 2, such as one or more add/drop devices and optical switches/routers/cross-connects interconnecting the transmitters 14 and receivers 12. For example, broadcast and/or wavelength reusable, add/drop devices, and optical and electrical/digital cross connect switches and routers can be configured via the network management system 18 in various topologies, e.g., rings, mesh, etc. to provide a desired network connectivity.

Optical combiners 24 can be used to combine the multiple signal channels $\lambda_i$ into WDM optical signals, as well as multiple pump wavelengths for transmission in the fiber 16. Likewise, optical distributors 26 can be provided to distribute the optical signal to the receivers 12 and optical signal and pump wavelengths to multiple paths. The optical combiners 24 and distributors 26 can include various multi-port devices, such as wavelength selective and non-selective ("passive"), fiber and free space devices, as well as polarization sensitive devices. The multi-port devices can various devices, such as circulators, passive, WDM, and polarization couplers/splitters, dichroic devices, prisms, diffraction gratings, arrayed waveguides, etc.

The multi-port devices can be used alone or in various combinations along with various tunable or fixed wavelength, high, low, or band pass or band-stop filters in the optical combiners 24 and distributors 26. Various transmissive or reflective, narrow or broad band filters can be used, such as Bragg gratings, Mach-Zehnder, Fabry-Perot and dichroic filters, etc. Furthermore, the combiners 24 and distributors 26 can include one or more parallel or serial stages incorporating various multi-port device and filter combinations to multiplex, consolidate, demultiplex, multicast, and/or broadcast signal channels $\lambda_{si}$ and pump wavelengths $\lambda_{pi}$ in the optical systems 10.

The optical amplifiers 22 amplify signals on the fiber path 16 and can be remotely monitored and controlled using, for example, a supervisory channel by providing appropriate circuitry at the amplifier 22 site as is known in the art. Optical amplifiers 22 can be disposed along the transmission fiber 16 to overcome attenuation in the fiber 16 and proximate the optical processing nodes 20 to overcome loss associated with the nodes 20, as required. The optical amplifiers 22 can include one or more serial or parallel amplifier stages. Distributed and concentrated/lumped, doped, e.g. erbium, and Raman fiber amplifier stages can be locally or remotely pumped with optical energy from a pump source. Semiconductor and other types of amplifier stages also can be included in the optical amplifiers 22, as well as various other stages for optical regeneration, dispersion compensation, etc.

Figure 3:
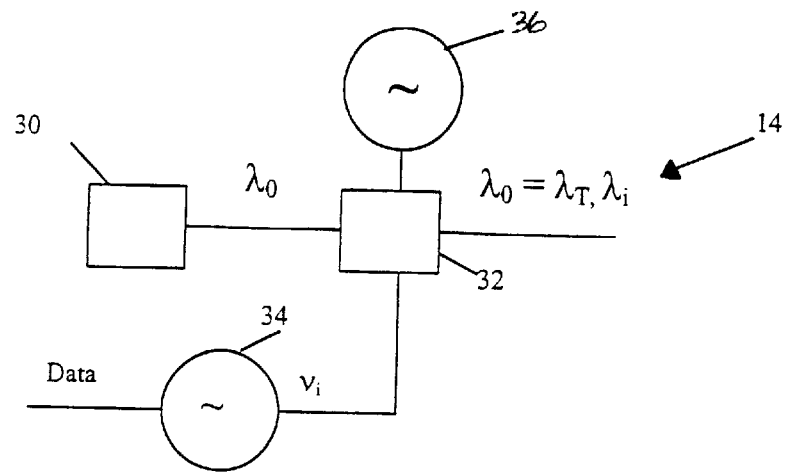
FIGS. 3a–3e are schematic diagrams illustrating exemplary transmitters.
Figure 3:
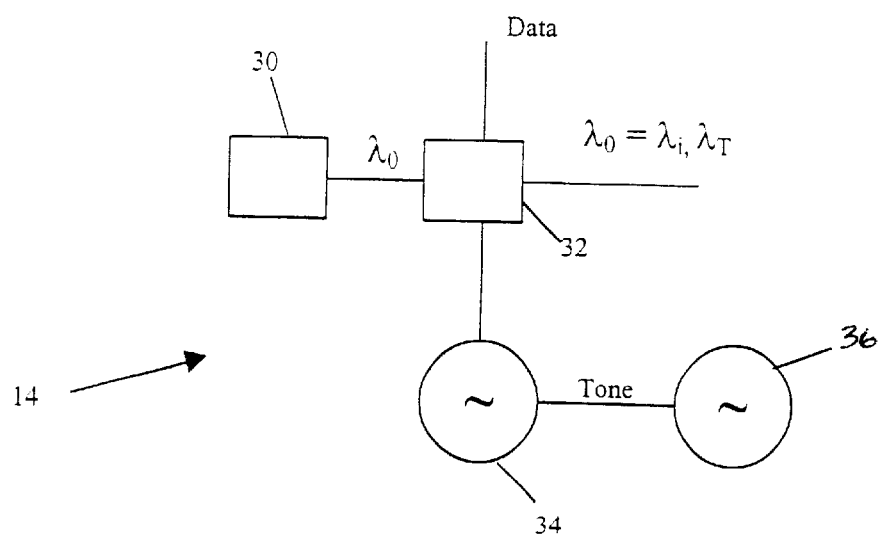

FIG. 3a is a schematic diagram illustrating one embodiment of a transmitter 14 according to the present invention. The transmitter 14 includes an optical source 30, an optical upconverter 32, an electrical oscillator source 34, and a tuning source 36. The transmitter 14 can be configured to upconvert one or more information streams and one or more tuning signals.

The optical source 30 provides optical energy which may be directly or externally modulated. In the illustrated embodiment, the optical source 30 provides optical energy at an optical carrier wavelength $\lambda_0$ to the optical upconverter 32, which externally modulates the optical carrier. The optical source 30 may be, for example, a DFB laser, a narrow bandwidth laser, or other coherent narrow or broadband sources, such as slice spectrum sources, as well as suitable incoherent optical sources as appropriate.

The electrical oscillator source 34 provides an electrical signal having a frequency $v_i$, onto which one or more information streams can be directly or externally imparted. One or more electrical oscillator sources 34 may be used to produce one or more information carrying electrical signal frequencies $v_i$.

The upconverter 32 upconverts the electrical signal frequencies $v_i$ into corresponding optical signal wavelengths $\lambda_i$ or subcarriers which are separated in frequency from the carrier wavelength $\lambda_0$ by the frequency $v_i$ of the electrical signal. The electrical oscillator sources 34 will typically be at RF or microwave frequencies to provide sufficient separation between the carrier frequency and the upconverted subcarrier frequencies.

The tuning source 36 is used to apply a tuning signal onto the carrier wavelength $\lambda_0$. The tuning source 36 may directly or externally modulate the optical source 30. In the illustrated embodiment, the tuning signal is connected to a bias lead of the upconverter 32 to externally modulate the tuning signal onto the carrier source. The tuning source 36 can be a relatively low frequency source (e.g. in the kilohertz range, such as 10 kHz). In addition, different tuning frequencies $v_T$ can be used to identify the different carrier wavelengths $\lambda_i$. For example, each information signal wavelength $\lambda_i$ may have it own unique and corresponding tuning signal. Alternatively, several information signal wavelengths $\lambda_i$ may share a common tuning signal. Furthermore, the tuning signal can be used to carry additional information, such as system supervisory or payload information, between the transmitter 14 and receiver 12. While amplitude modulation may be more often used because of the lower cost typically associated with it, other modulation schemes, such as phase modulation and frequency modulation, may also be used to impart the tuning signal.

The transmitter 14 may be implemented with a single optical source 30 producing the information signal wavelength $\lambda_i$ and the tuning wavelength $\lambda_T$. In that embodiment, to the extent that the signals vary, they will generally vary together. Therefore, once the receiver 12 adjusts to compensate for variations in the tuning signal wavelength $\lambda_T$, it should be adjusted to compensate for variations in the information signal wavelengths $\lambda_i$. The transmitter 14 may also be implemented with more than one optical sources 30. In one such embodiment, one or more information signals may be transmitted using one or more optical sources 30 at one or more frequencies, and the tuning signal may be transmitted using one of the information signal optical sources 30 or using a separate optical source 30. In multiple source embodiments, however, the separate optical sources 30 may vary differently, due to temperature and other factors, making it more difficult to compensate for those variations than in an embodiment using a single optical source 30.

Additional description of transmitter 14 including optical upconverters 32 for use in the present invention can be found in commonly assigned U.S. patent application Ser. No. 09/185,820, which is incorporated herein by reference.

FIG. 3b is a schematic diagram illustrating another embodiment of the transmitter 14 in which the tuning signal directly modulates the electrical source 34, and the resulting electrical tuning frequencies $v_T$ and information signal frequencies $v_i$ are upconverted on corresponding subcarrier wavelengths of the carrier wavelength $\lambda_0$.

Figure 3C:
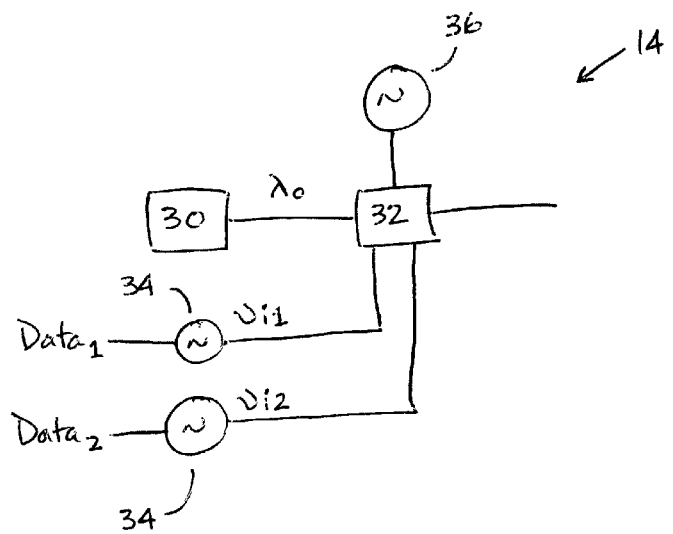

FIG. 3c is a schematic diagram illustrating another embodiment of the transmitter 14 in which two electrical oscillation sources 34 are modulated with two information signals ($Data_1$ and $Data_2$), which are provided at frequencies $v_{i1}$ and $v_{i2}$. The electrical information signals are upconverted by the upconverter 32. In that embodiment, the tuning signal may be at the carrier wavelength $\lambda_0$, and the information signals may be on subcarriers of carrier wavelength $\lambda_0$, with one information wavelength $\lambda_{i+}$ at a longer wavelength than $\lambda_0$ and one information wavelength $\lambda_{i-}$ at a shorter wavelength than $\lambda_0$. The tuning and information signals, of course, may be oriented in other manners.

Figure 3D:
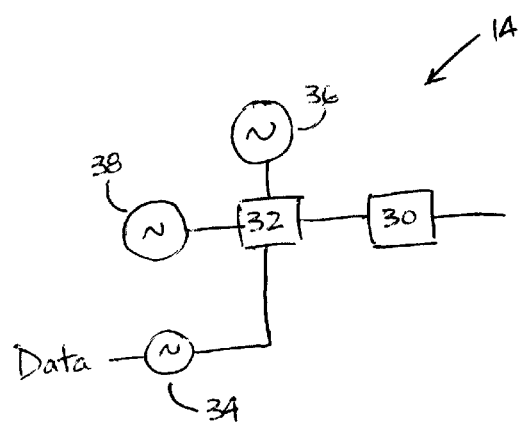

FIG. 3d is a schematic diagram illustrating another embodiment of the receiver 12 in which the optical source 30 is directly modulated. In that embodiment, the tuning signal source 36, the carrier signal source 38, and the information signal oscillator 34 are connected to the upconverter 32, and the output is used to directly modulate the optical source 30. Of course, more or less signals may be combined and used to modulate the optical source 30. Furthermore, combinations of direct and external modulation may also be used to realize benefits of the present invention.

Figure 3E:
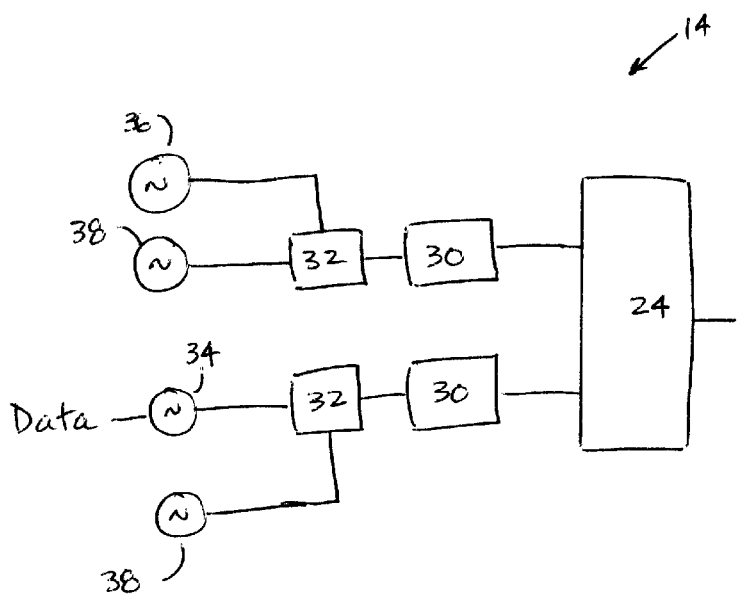

FIG. 3e is a schematic diagram illustrating another embodiment of the transmitter 14 wherein separate optical tuning and information signals are generated and then combined with a combiner 24. In that embodiment, the optical tuning signal may be generated at one location and the optical information signal generated at another location, such as different circuit boards within the same device or even in different devices.

Various components, such as the oscillator source 34, the tuning source 36, the carrier source 38, and the upconverter 32 are illustrated in the above embodiments as separate components for the sake of clarity. However, two or more of those devices may be combined into a single device, such as one which takes one or more input signals, upconverts those signals onto a predetermined carrier signal, or onto a carrier signal which is provided to the device, and produces the upconverted signal at an output terminal.

Figure 4:
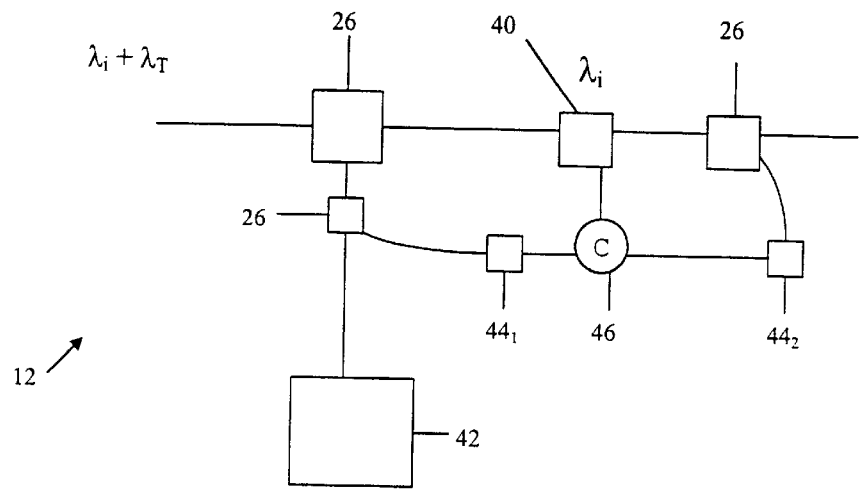
FIGS. 4a and 4c–4j are schematic diagrams illustrating exemplary optical receivers.
FIG. 4b is a schematic diagram illustrating exemplary optical filter performance versus wavelength curve.
Figure 4:
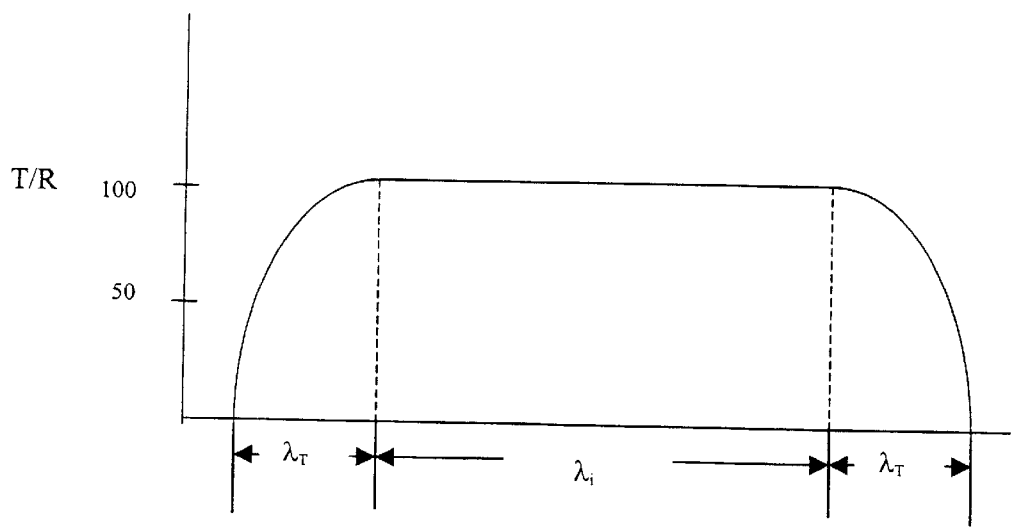
Figure 4:
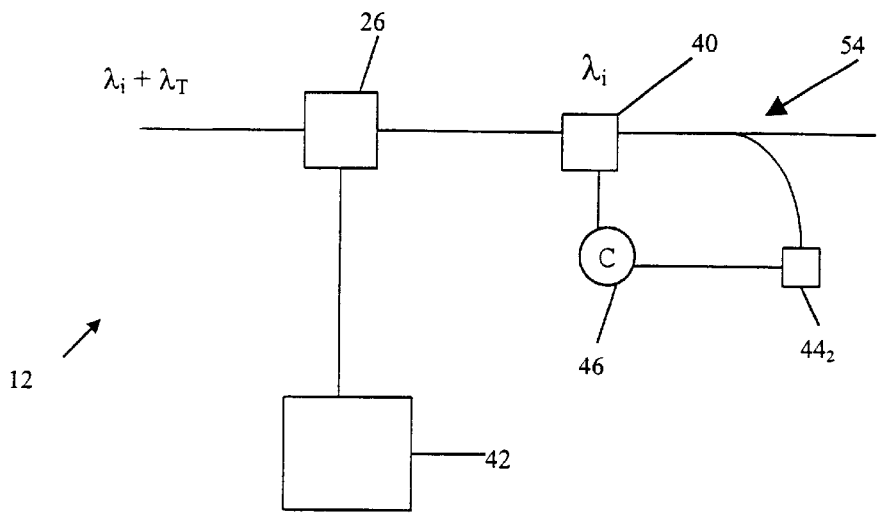
Figure 4:
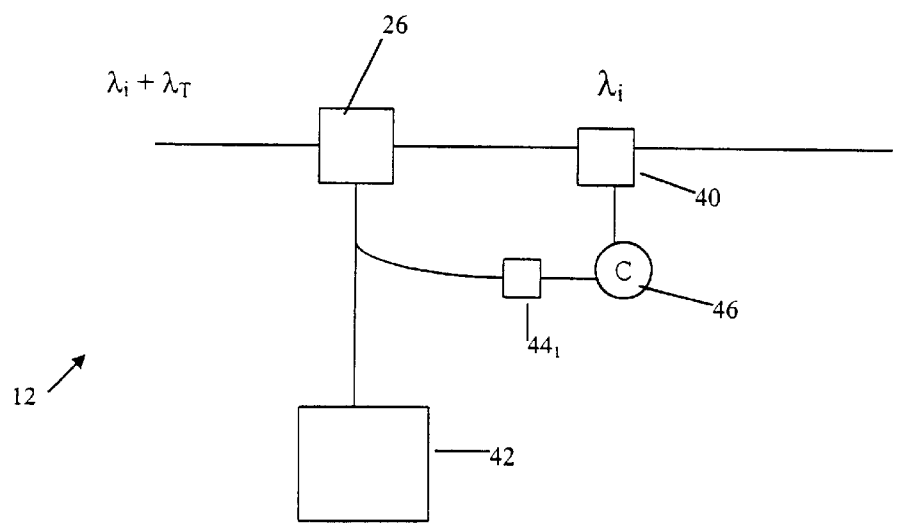
Figure 4:
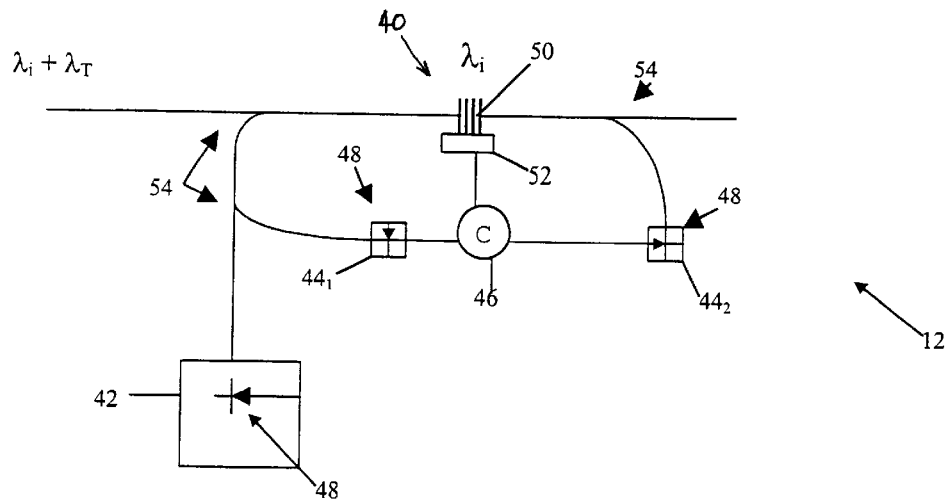
Figure 4:
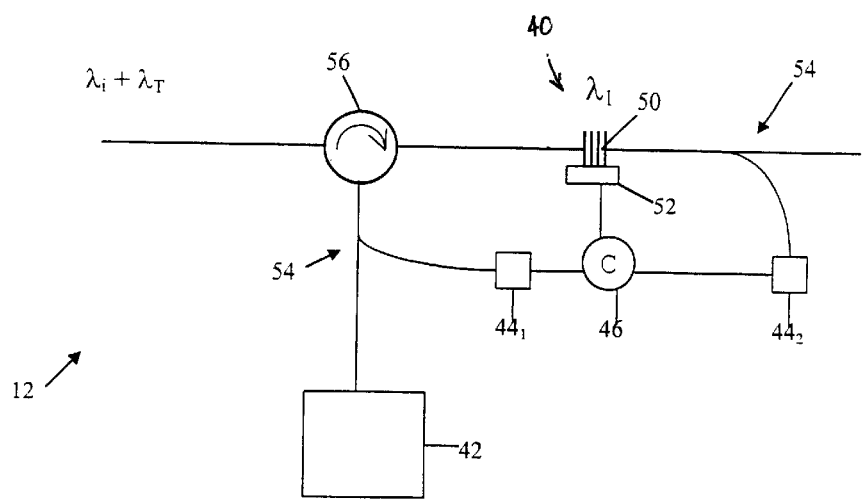

FIG. 4a is a schematic diagram illustrating one embodiment of the receiver 12 according to the present invention. The receiver 12 can employ either direct or coherent detection techniques. The receiver 12 generally includes an optical filter 40, one or more optical distributors 26, signal converters 42, tuning converters 44, and a controller 46.

The optical filter 40 has a filtering bandwidth selective to one or more information signal wavelengths $\lambda_i$ to be received and at least a portion of the corresponding tuning wavelength $\lambda_T$. The filter 40 can include one or more filter designs and types including Bragg gratings 50, Fabry-Perot filters, dichroic filters, etc., as may be appropriate depending upon, for example, the channel spacing used in the system 10. The percentage of the tuning wavelength $\lambda_T$ that is passed or reflected by the optical filter 40 depends upon the selection of the tuning wavelength within the filter bandwidth, and will vary depending on the particular application of the invention. In one embodiment, 50% of the signal is reflected and 50% is passed. In other embodiments, the filter 40 may pass and reflect unequal portions of the tuning wavelength $\lambda_T$. One example of a filter 40 performance versus wavelength curve is illustrated in FIG. 4(b).

The optical distributors 26 distribute the signals to other elements in the receiver 12, such as the signal converters 42 and tuning converters 44. The distributors 26 may be, for example, couplers and circulators, and can be used to provide the information signal wavelength $\lambda_i$ and first and second portions of the tuning wavelength $\lambda_T$ to the signal converter 42 and first and second tuning converters $44_1$ and $44_2$, respectively. The distributors 26 may equally split signals or, alternatively, the distributors 26 may unequally split the signals.

The signal converter 42 receives the optical information signal wavelength $\lambda_i$ and produces an electrical signal indicative thereof. The signal converter 42 may employ, for example, photodiodes 48, as well as other optical to electrical converters, and associated receiver circuitry.

The tuning converters $44_1$, $44_2$ each receive a portion of the optical tuning signal wavelength $\lambda_T$ and provide electrical signals to the controller 46 indicative of the optical power in the portion of the tuning signal wavelengths $\lambda_T$ received by each of the converters $44_1$, $44_2$. The tuning converters $44_1$, $44_2$ may be the same or a similar type of converter as the signal converter 42. In an embodiment where the tuning signal is a lower frequency than the information signal, it may be advantageous for the tuning converter $44_1$ to be a lower frequency device than the signal converter 42, such as a low frequency photodiode. For example, the tuning converter $44_1$ may have a bandwidth that does not extend to the range of the information signals. As a result, the information signals will not be converted by the tuning converter and, therefore, will not interfere with the operation of the controller 46. Alternatively, additional filters may be used to shield the tuning converter $44_1$ from the information signal wavelength $\lambda_i$. Similarly, the other tuning converter $44_2$ can have a limited bandwidth and/or additional filtering.

The controller 46 receives signals from the tuning converters $44_1$, $44_2$ and controls the tuning of the optical filter 40 based on the relative optical power at the tuning wavelength $\lambda_T$ received by the converters $44_1$, $44_2$. The controller 46 can control the optical filter 40 performance using feedback from both the passed and stopped portion of the tuning wavelength $\lambda_T$, or using feedback from only one of the passed and the stopped portions of the tuning wavelength $\lambda_T$. For example, the controller 46 can compare the tuning wavelength $\lambda_T$ power received from one or both of the converters $44_1$, $44_2$ to a predetermined tuning power and the difference used to control the tuning of the optical filter 40, or adjust the filter to maintain the converters $44_1$, $44_2$ in a predetermined range or condition. Alternatively, the controller 46 can compare the signals from the tuning converters $44_1$, $44_2$ and adjust the filter 40 to equalize the tuning signal received at each tuning converter $44_1$, $44_2$, or to achieve some other relationship between the tuning signals. The controller 46 may be, for example, a digital signal processor, an application specific integrated circuit, or an analog or digital circuit including discrete components and/or integrated circuits.

It will be appreciated that additional signal wavelengths can be received in the present example by employing additional receivers with optical filters corresponding to the additional signal wavelengths and including the tuning wavelength $\lambda_T$. In addition, each receiver 12 may be configured to receive multiple information signals by, for example, utilizing a filter having a bandwidth to reflect multiple signal wavelengths that can be coherent detected or additionally filtered in other stages. Furthermore, although the receiver 12 has been described in terms of the information signal of interest being reflected by the filter 40 and that reflected signal converted by the signal converter 42, the present invention may also be utilized such that the information signal of interest passes through the filter 40 and that passed signal is eventually converted by the signal converter 42.

FIG. 4b is a graph of filter performance versus wavelength for an exemplary filter 40. The performance is typically either transmissivity (T) or reflectivity (R), depending upon the particular filter 40 used in the system 10. The filter 40 is generally designed to maximize the filter performance for the signal wavelengths and to provide a band of wavelengths over which the performance is relatively constant. The tuning wavelengths are typically selected in wavelength ranges of the filter in which the performance of the filter varies with wavelength. It will be appreciated that lower performance filters having performance curves that vary from FIG. 4(b) can be also be used in the present invention. In this manner, variations in the fiber Bragg grating or the transmitter performance can be detected by variations in the filter performance at the tuning wavelengths $\lambda_T$ and adjusted accordingly.

FIG. 4c is a schematic diagram illustrating another embodiment of the receiver 12 in which a single tuning converter $44_2$ is used to detect transmitted power at the tuning wavelength $\lambda_T$, and the controller 46 controls the filter 40 based on signals from that single tuning converter $44_2$.

FIG. 4d is a schematic diagram illustrating another embodiment of the receiver 12 in which a single tuning converter $44_1$ is used to detect reflected power at the tuning wavelength $\lambda_T$, and the controller 46 controls the filter 40 based on signals from that single tuning converter $44_1$.

FIGS. 4e and 4f are schematic diagrams illustrating the receiver 12 with tunable fiber Bragg gratings 50 used in combination with various optical distributors 26, such couplers 54 and circulators 56, to provide the information signal wavelengths $\lambda_i$ and the tuning wavelengths $\lambda_T$ to the respective converters 44. Those embodiments also illustrate a filter controller 52 which may be, for example, a temperature or strain controller to tune the filter 40.

Figure 4G:
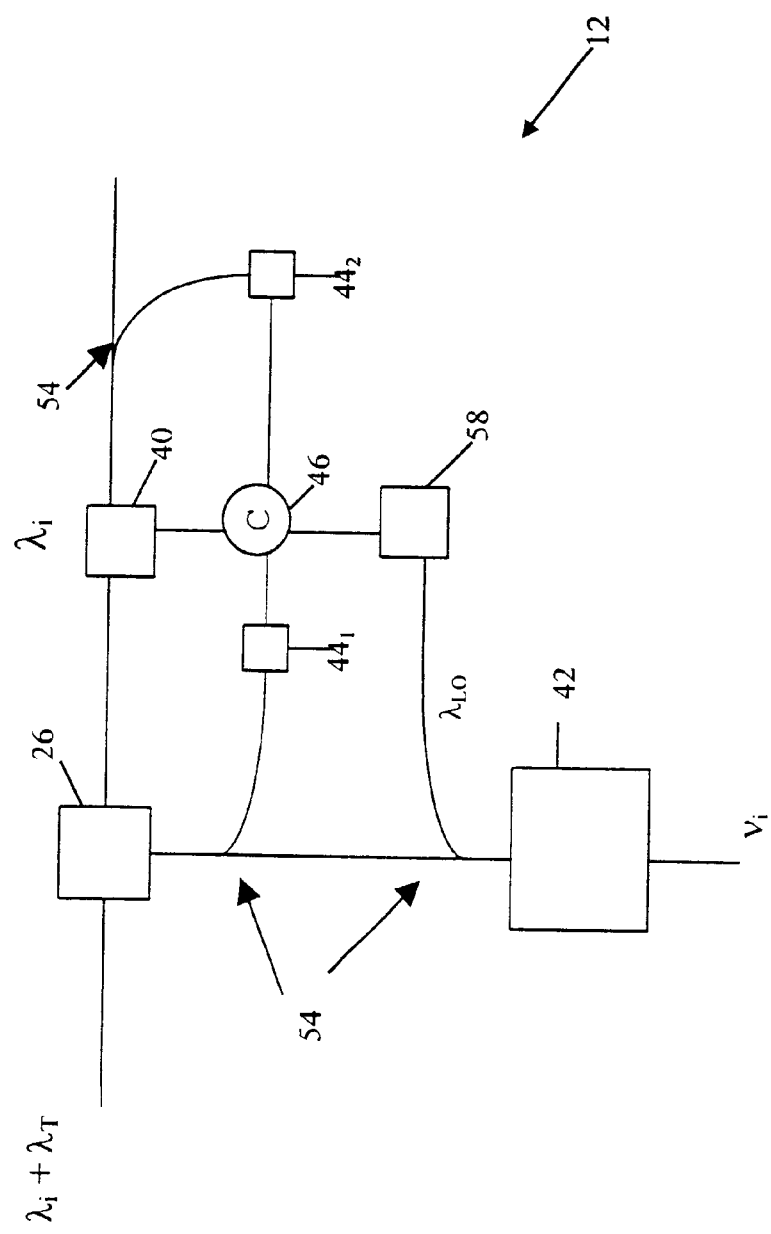

FIG. 4g is a schematic diagram illustrating another embodiment of the receiver 12 which includes a local optical source 58. The local optical source 58 can be used to provide optical power in a local optical wavelength $\lambda_{LO}$ to the signal converter 42 along with the signal wavelengths $\lambda_i$. The signal converter 42 can be configured to coherently detect and down-convert one or more signal wavelengths onto corresponding electrical signal frequencies $v_i$ using the local optical wavelength $\lambda_{LO}$. The electrical signal frequencies $v_i$ can be electrically demultiplexed and provided to an electrical system or another optical system. The local optical source 58 can employ an optical filter to tune the local optical wavelength that corresponds to the optical filter 40 used to filter the signal wavelengths. The controller 46 can then be used to tune the wavelength of the local optical source 58 to track the signal wavelengths and the optical filter 40.

Figure 4H:
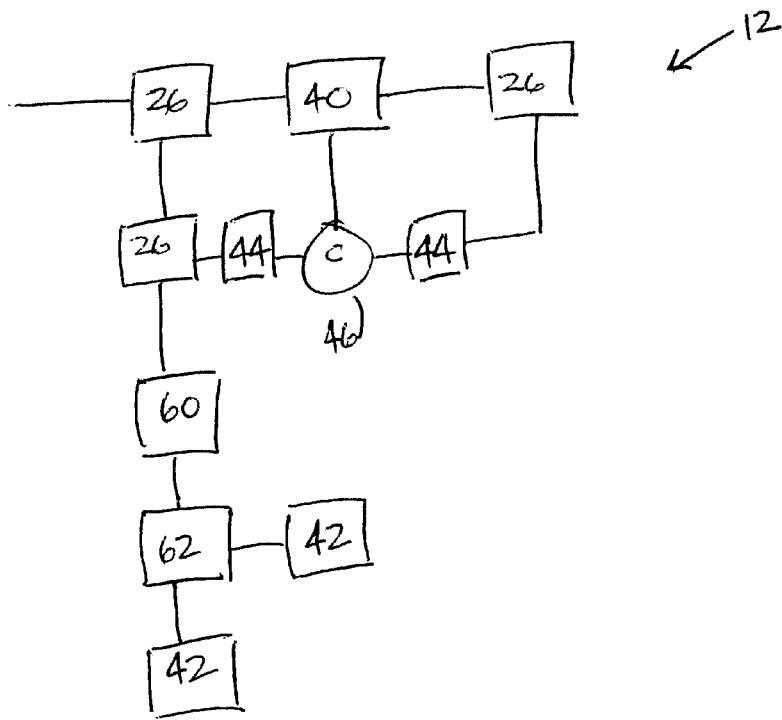

FIG. 4h is a schematic diagram illustrating an embodiment of the receiver 12 which receives orthogonally polarized information signals at the same wavelength $\lambda_i$, along with a tuning signal at a tuning wavelength $\lambda_T$. In that embodiment the orthogonally polarized information signals and at least part of the tuning wavelength are within the wavelength band of the filter 40. The receiver 12 includes a polarization controller 60 and a polarization beam splitter 62 to separate the orthogonally polarized signals and sends them to their respective signal converters 42.

Figure 4I:
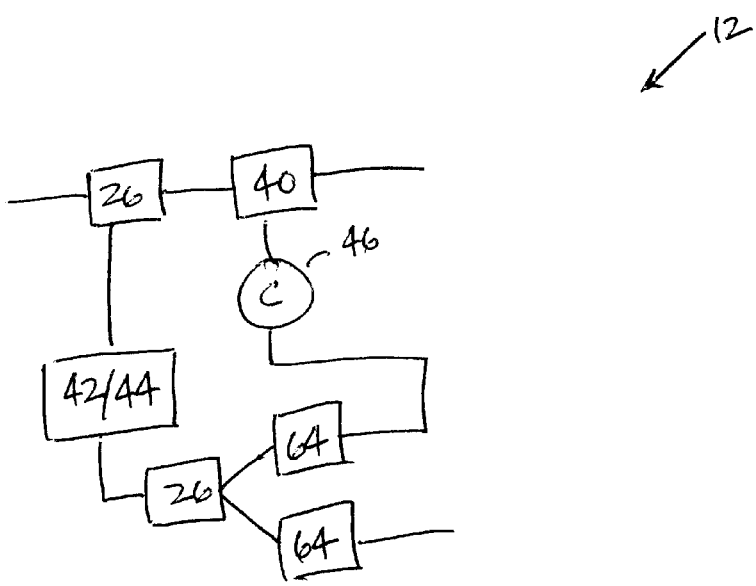

FIG. 4i is a schematic diagram illustrating an embodiment of the receiver 12 wherein the signal converter 42 and the tuning converter 44 are combined into a single device which produces an electrical signal corresponding to both the tuning signal and the information signal. The tuning and information signals can be extracted, such as with a filters or electrical downconverters 64, to produce individual tuning and information signals. Alternatively, the device 42/44 may separate the signals and provide them on separate output terminals.

Figure 4J:
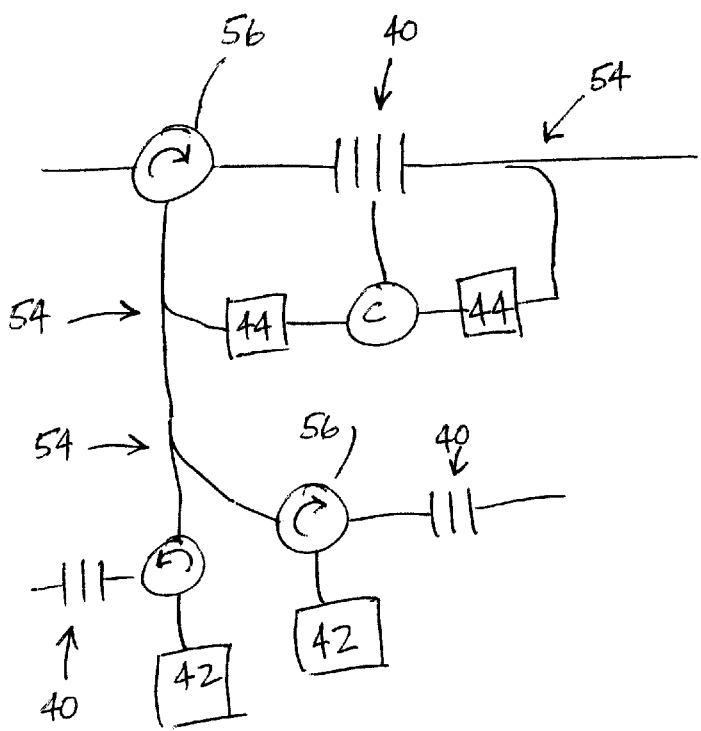

FIG. 4j is a schematic diagram of another embodiment of the receiver 12 wherein more than one information signal wavelength $\lambda_i$ is present on at least one side of the tuning wavelength $\lambda_T$. The information signal wavelengths $\lambda_i$ on one side of the tuning wavelength $\lambda_T$ are reflected by the filter 40. Additional distributors 26, illustrated as splitters 54 and circulators 56, and filters 40 are used to separate the information signal wavelengths $\lambda_i$ and provide them to their respective signal converters 42.

One example of the operation of the present invention will be described. A transmitter 14 produces an optical signal having one or more information signals and one or more tuning signals. The signal may be produced by one or more optical sources 30 which may be directly and/or externally modulated. Each information signal may have its own corresponding tuning signal, or more than one information signal may share a tuning signal, or more than one tuning signal may correspond to each information signal.

A receiver 12 receives one or more information signal wavelengths $\lambda_i$ and one or more tuning wavelength $\lambda_T$. The optical filter 40 selectively filters the received signal, such as by reflecting one or more of the information signals and reflecting at least a portion of the tuning signal. It is often desirable for the information signal wavelengths $\lambda_i$ to be filtered by a substantially wavelength independent portion of the filter 40, and for the tuning frequency $\lambda_T$ to be filtered at a portion of the filter 40 that has a wavelength dependency so that adjustments to the filter 40 result in measurable changes to the tuning signal.

The reflected signal and tuning wavelengths $\lambda_i$, $\lambda_T$ are distributed to the signal and tuning converters 42, 44. The signal and tuning converters 42, 44 generate electrical signals corresponding to the information and tuning signals, respectively. One or more signal converters 42 produces electrical signals indicative of the information signals. One or more tuning converters 44 provide one or more signals to the controller 46, which tunes the filter 40 based on those signals. For example, if more than one signal converter 44 is used, the controller 46 may adjust the filter 40 to equalize the electrical tuning signals produced by the tuning converters 44, or to produce some other predetermined condition or relationship of the signals produced by the tuning converters 44. If a single tuning converter 44 is used, the controller 46 may adjust the filter 40 so as to maintain the electrical signal produced by the tuning converter 44 within a predetermined range or condition.

The present invention may take many other embodiments and variations. In one such embodiment, one information signal wavelength $\lambda_{I+}$ is a longer wavelength than the tuning wavelength $\lambda_T$ and another information signal wavelength $\lambda_{I-}$ is a shorter wavelength than the tuning wavelength $\lambda_T$. The filter 40, when centered on the tuning wavelength $\lambda_T$, may be configured to reflect one of the information signal wavelengths $\lambda_{I+}$ or $\lambda_{I-}$, reflect a portion and pass a portion of the tuning signal wavelength $\lambda_T$, and pass the other of the information signal wavelengths $\lambda_{I+}$ or $\lambda_{I-}$. As a result, by tuning the filter 40 using the tuning signal, the filter 40 will compensate for variations in the signal wavelength and will filter one or more of the information signal wavelengths $\lambda_{I+}$. For example, wavelength $\lambda_{I+}$ may be reflected and converted by the signal converter 42, and wavelength $\lambda_{i-}$ may be passed and captured in a manner similar to that used for the reflected signal wavelength $\lambda_{I+}$.

The present invention may be implemented in other embodiments, such as those using more or less information signal wavelengths $\lambda_i$ with each tuning signal wavelength $\lambda_T$, those placing the information signals and tuning signals at different places relative to the carrier wavelength $\lambda_o$, etc.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical transmission system comprising:
    an optical transmitter configured to transmit at least one signal wavelength and a tuning wavelength;

an optical receiver including an optical filter having a filter bandwidth including the at least one signal wavelength and a percentage of the tuning wavelength, and an optical to electrical signal converter configured to receive the at least one signal wavelength from said filter;

a first tuning optical to electrical converter configured to receive a first portion of the tuning wavelength stopped by said filter;

a second tuning optical to electrical converter configured to receive a second portion of the tuning wavelength passed by said filter; and, a filter controller configured to tune the filter bandwidth based on the relative proportion of first and second portions of the tuning wavelength provided to the first and second tuning optical to electrical converters.

2. The system of claim 1, wherein said filter includes a Bragg grating configured to reflect the at least one signal wavelength and the first portion of the tuning wavelength and transmit the second portion of the tuning wavelength.

3. The system of claim 2, wherein said Bragg grating is configured to reflect and transmit 50% of the tuning wavelength.

4. The system of claim 1, wherein said filter includes a Bragg grating configured to transmit the at least one signal wavelength and the first portion of the tuning wavelength and reflect the second portion of the tuning wavelength.

5. The system of claim 1, wherein said filter controller includes a temperature controller configured to thermally tune said optical filter.

6. The system of claim 1, wherein said filter controller includes a strain controller configured to tune the optical filter by varying at least one of compressive strain and tensile strain applied to said filter.

7. The system of claim 1, wherein said transmitter includes an optical source providing optical energy at a carrier wavelength, and said transmitter is configured to transmit one signal wavelength at the carrier wavelength and the tuning wavelength on a subcarrier wavelength of the optical source.

8. The system of claim 1, wherein said transmitter includes an optical source providing optical energy at a carrier wavelength, and said transmitter is configured to transmit at least one signal wavelength on a subcarrier wavelength of the carrier wavelength and the tuning wavelength on the carrier wavelength.

9. The system of claim 1, wherein said receiver includes a local optical source configured to provide a local optical signal to said signal optical to electrical converter to down-convert the at least one signal wavelength.

10. The system of claim 9, wherein said filter has a filter bandwidth including a plurality of signal wavelengths; said signal converter is configured to down-convert the plurality of signal wavelengths to a corresponding plurality of electrical signal frequencies.

11. A method of tuning an optical filter to an optical signal wavelength comprising:

providing an optical filter having a filter bandwidth including an optical signal wavelength and a portion of a tuning wavelength;

transmitting information via the optical signal wavelength and along with the tuning wavelength to said filter;

receiving a first portion of the tuning wavelength stopped by the filter and a second portion of the tuning wavelength passed by the filter; and, tuning the filter based on the relative amount of the first and second received portions.

12. An optical receiver comprising:

an optical filter having a filter bandwidth including at least one signal wavelength and a portion of a tuning wavelength;

an optical to electrical signal converter configured to receive at least one signal wavelength from said filter;

a first tuning optical to electrical converter configured to receive one of a first portion of the tuning wavelength stopped by said filter and a second portion of the tuning wavelength passed by said filter; and a controller configured to tune the filter bandwidth based on the portion of the tuning wavelength received by said first tuning converter.

13. The receiver of claim 12, wherein the first tuning converter is configured to receive a first portion of the tuning wavelength stopped by the filter and further comprising a second tuning optical to electrical converter configured to receive a second portion of the tuning wavelength passed by said filter, and wherein the controller is configured to tune the filter based on relative powers of the first and second portions of the tuning wavelength received by said first and second tuning optical to electrical converters.

14. The optical receiver of claim 13 further comprising:

a first optical splitter configured to provide the first portion to the first tuning optical to electrical converter; and a second optical splitter configured to provide the first portion to the second tuning optical to electrical converter.

15. The optical receiver of claim 13, wherein said optical to electrical signal converter and said first and second optical to electrical tuning converter include photodiode detectors.

16. The optical receiver of claim 12 further comprising a first optical circulator configured to provide the first portion of the tuning wavelength and the at least one signal wavelength to the optical to electrical signal converter.

17. An optical transmission system comprising:

at least one optical transmitter configured to transmit at least one signal wavelength and a tuning wavelength;

an optical receiver including an optical filter having a filter bandwidth including the at least one signal wavelength and a percentage of the tuning wavelength and an optical to electrical signal converter configured to receive the at least one signal wavelength from said filter;

a tuning optical to electrical converter configured to receive a first portion of the tuning wavelength from said filter; and, a filter controller configured to tune the filter bandwidth based on the first portion of the tuning wavelength power and a tuning wavelength set point power.

18. A method of transmitting and receiving information, comprising:

transmitting the information via an optical signal wavelength;

transmitting a tuning signal via a tuning wavelength;

filtering the information and the tuning signal with an optical filter;

converting a portion of the tuning signal into an electrical tuning signal;

tuning the optical filter in response to the electrical tuning signal; and converting the information into an electrical information signal.

19. The method of claim 18, wherein filtering the information is selected from a group consisting of reflecting the information with the optical filter and passing the information through the optical filter.

20. The method of claim 18, wherein filtering the tuning signal is selected from a group consisting of reflecting a portion of the tuning signal with the optical filter, and passing a portion of the tuning signal through the optical filter.

21. The method of claim 18, wherein: filtering includes reflecting the information signal, reflecting a first portion of the tuning signal, and passing a second portion of the tuning signal.

22. The method of claim 21, wherein converting the tuning signal includes converting one of the first and second portions of the tuning signal.

23. The method of claim 21, wherein converting the tuning signal includes converting both the first and second portions of the tuning signal.

24. The method of claim 18, wherein tuning the filter is selected from a group consisting of controlling temperature of the filter and controlling strain of the filter.

25. The method of claim 18, wherein tuning the filter includes tuning the filter to maintain a predetermined electrical tuning signal.

26. The method of claim 25, wherein tuning the filter includes tuning the filter to maintain a first electrical tuning signal equal to a second electrical tuning signal.

27. The method of claim 25, wherein tuning the filter includes tuning the filter to maintain the electrical tuning signal within a predetermined range.

28. A method of receiving information transmitted via an optical signal wavelength and transmitted with a tuning signal at a tuning wavelength, comprising:

filtering the information at the optical signal wavelength and a portion of the tuning signal at the tuning wavelength with an optical filter;

converting the portion of the tuning signal into an electrical tuning signal; tuning the optical filter in response to the electrical tuning signal; and converting the information into an electrical information signal.

29. An optical receiver comprising:

an optical filter having a filter bandwidth selective to an information signal wavelength, selective to a first portion of a tuning wavelength, and not selective to a second portion of the tuning wavelength;

an optical to electrical information signal converter having an optical input terminal configured to receive the information signal wavelength from the filter and having an electrical output terminal;

an optical to electrical tuning signal converter having an optical input terminal configured to receive one of the first and second portions of the tuning wavelength, and having an electrical output terminal; and a filter controller having an input terminal and configured to adjust the filter; and a controller having an input terminal connected to the output terminal of the tuning converter, and having an output terminal connected to the input terminal of the filter controller, and wherein the controller includes computer readable instructions which, when executed by the controller, cause the controller to perform the steps of:

reading a signal at the input terminal of the controller;

comparing the signal with a predetermined condition; and sending a control signal to the filter controller depending on a relationship between the signal and the predetermined condition.

* * * * *